C. B. RICHARDS.
Steam Engine Indicator.
No. 37,980. Patented March 24, 1863.
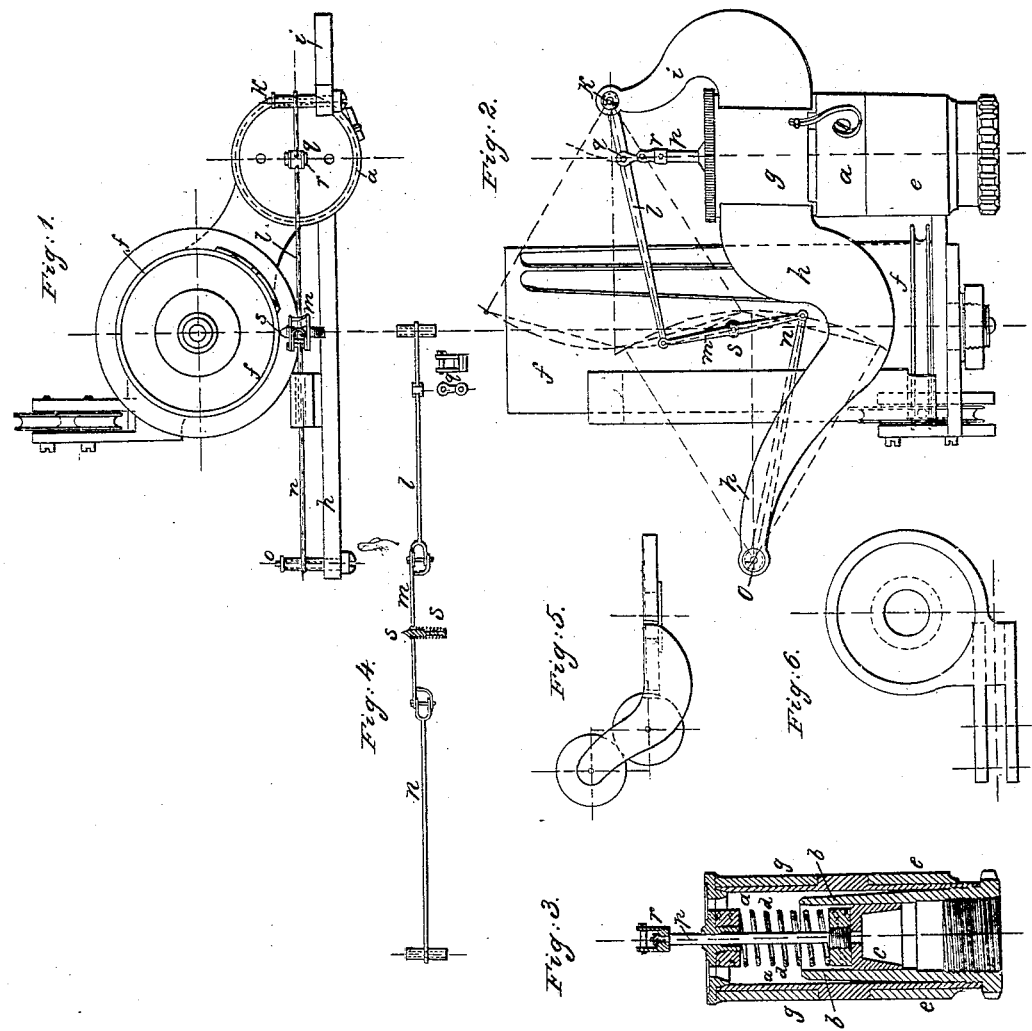
Witnesses:
Samuel U. Bidwell
Horatio B. Weaver
Inventor:
C. B. Richards

UNITED STATES PATENT OFFICE.

C. B. RICHARDS, OF HARTFORD, CONNECTICUT, ASSIGNOR TO C. T. PORTER, OF NEW YORK, N. Y.

IMPROVED STEAM-ENGINE INDICATOR.

Specification forming part of Letters Patent No. 37,980, dated March 24, 1863.

*To all whom it may concern:*

Be it known that I, C. B. RICHARDS, of Hartford, in the county of Hartford, in the State of Connecticut, have invented a certain new and useful Improvement in Steam-Engine Indicators; and I do hereby declare that the following is a full, clear, and exact description of the same, reference being had to the accompanying drawings, making part of this specification, and to the letters of reference marked thereon, in which—

Figure 1 is a plan of the instrument. Fig. 2 is a side elevation of the same. Fig. 3 is a vertical section through the center of the spring-case A, and Figs. 4, 5, and 6 show parts of the instrument in detail.

Similar letters of reference denote the same parts in the several figures.

My invention relates to an improvement in apparatus for indicating and delineating the action of steam in the cylinder of a steam-engine. The form of steam-engine indicator in most general use is that commonly known as the "McNaught indicator," in which the piston and its guiding-rod have the same range of motion as the pencil; but as the piston and rod are necessarily made quite heavy, and their range of motion extensive in order to produce delineations on a sufficiently-large scale, the momentum of these parts is so great as to render the instrument unserviceable for application to engines having rapid movement. While, therefore, it is desirable to reduce the momentum of the parts which are moved by the varying pressures of the steam, it is also desirable that the pencil or marking-point should move in a straight line, in order that its delineations, which should be on a large scale, may readily be measured with accuracy, and in order, also, that the paper on which the delineations are made may be clamped in the usual manner around a cylindrical drum, to which the requisite movements can be readily given by the customary means.

To furnish an instrument possessing the above-mentioned desirable features is the object of my invention; and to this end my said invention consists in the employment of a lever or its equivalent so connected with the pencil and the piston as to give to the pencil a range of motion greater than that of the piston, in combination with a system of levers, or an equivalent therefor, so arranged as to cause the pencil's point to travel in a straight line, substantially in the manner hereinafter clearly set forth.

To enable others skilled in the art to make and use my invention, I will proceed to a description thereof.

In the accompanying drawings, $a$ is a cylindrical case containing a small steam-cylinder, $b$, in which moves a piston, $c$, the movements of which are regulated by a spiral spring, $d$. These parts are constructed and arranged in a manner similar to, but are much shorter than, the corresponding parts of an ordinary McNaught indicator, making delineations on the same scale. To the outside of the case $a$ is secured a ferrule, $e$, an arm from which supports a cylindrical paper-holder, $f$, which in construction and arrangement is similar to the paper-holding drum of a McNaught indicator, and it receives the proper reciprocating movements in the same manner. Around the upper part of the case $a$ is a ferrule, $g$, to which are attached two arms, $h$ and $i$, one of which, $i$, supports the fulcrum-pin $k$ of a light lever, $l$, the extreme end of which lever is jointed to the end of a lever or link, $m$, the opposite end of which is jointed to the extremity of a delicate lever or radius-bar, $n$, the fulcrum-pin $o$ of which is supported by the arm $h$. To the lever $l$, at a point distant from its fulcrum $k$ about one-fourth of the length of the lever, the rod $p$ of the piston $c$ is connected, by means of a forked link, $q$, which is jointed to a knuckle, $r$, secured to the upper end of the rod $p$. In the center of the link $m$ is a holder for the pencil $s$, which receives from the piston $c$ through the lever $l$ a range of perpendicular motion about four times greater than that of the said piston, and the levers $l$ and $n$ are so proportioned and their fulcra are so adjusted that the marking-point of the pencil $s$ is caused to move in a straight line in the same manner that the "parallel motion" of a steam-engine causes the end of the piston-rod to move in a right line. The movements of the levers are indicated in Fig. 2 by red lines.

The application and mode of using my improved indicator are essentially the same as of McNaught's instrument, and need no description. Although I have described the movement of the piston as being about one-fourth that of the pencil, yet in some cases it may be desirable to give a relative movement to the piston less than that specified, as in the case of engines with very rapid reciprocating movements, and in which the steam is cut off early in the stroke. The pencil may be guided in a straight line by a slide attached thereto and moving in straight guides, instead of by the parallel motion described. By reducing the range of movement of the piston, its rod, and the spring, the weight and momentum of these parts, which are necessarily made of considerable strength, are much reduced. The pencil, though it has a long range of motion, and consequently makes its indications on a desirably-large scale, has but little momentum, because of its extreme lightness and the lightness of the levers which give it motion. The movement of the pencil's point in a straight line permits the use of a cylindrical paper-holder, which is the most compact, convenient, and easily operated of any of the devices which have been contrived for presenting the paper to the action of the pencil. The delineations made by a pencil moving in a straight line are much more readily measured with accuracy than those produced by a pencil moving in a curved path.

I am aware that in an indicator invented by Gooch, and described in works on the steam-engine, the piston has a motion less than that of the pencil, but the pencil moves in an arc of a circle and records its indications on paper moved over a flat surface by complex mechanism. I therefore disclaim the use of different relative movements of the piston and pencil when the pencil's point moves in a curved path; but

What I claim as my invention, and desire to secure by Letters Patent, is—

The means, substantially hereinbefore described, for giving to the marking-point a range of motion greater than that of the piston by which it is actuated, in combination with the described means, or an equivalent therefor, by which the marking-point is caused to travel in a straight line, substantially as and for the purposes hereinbefore specified.

C. B. RICHARDS.

Witnesses:
 FRANCIS FELLOWES,
 FRANCIS FELLOWES, Jr.